(12) United States Patent
Kerstein (10) Patent No.: US 9,744,849 B2
(45) Date of Patent: Aug. 29, 2017

(54) FUEL NOZZLE RECEIVING ASSEMBLY

(71) Applicant: ILLINOIS TOOL WORKS INC., Glenview, IL (US)

(72) Inventor: Alex M. Kerstein, Chicago, IL (US)

(73) Assignee: Illinois Tool Works Inc., Glenview, IL (US)

( * ) Notice: Subject to any disclaimer, the term of this patent is extended or adjusted under 35 U.S.C. 154(b) by 0 days.

(21) Appl. No.: 15/103,917

(22) PCT Filed: Nov. 6, 2014

(86) PCT No.: PCT/US2014/064300
§ 371 (c)(1),
(2) Date: Jun. 13, 2016

(87) PCT Pub. No.: WO2015/094505
PCT Pub. Date: Jun. 25, 2015

(65) Prior Publication Data
US 2016/0311316 A1    Oct. 27, 2016

Related U.S. Application Data

(60) Provisional application No. 61/918,295, filed on Dec. 19, 2013.

(51) Int. Cl.
*B60K 15/04* (2006.01)
(52) U.S. Cl.
CPC ........ *B60K 15/04* (2013.01); *B60K 2015/048* (2013.01); *B60K 2015/0461* (2013.01); *B60K 2015/0483* (2013.01)

(58) Field of Classification Search
CPC .................................................... B60K 15/04
USPC ................ 220/86.2, 86.1; 141/350, 349, 348
See application file for complete search history.

(56) References Cited

U.S. PATENT DOCUMENTS

| | | | | |
|---|---|---|---|---|
| 4,450,880 A | * | 5/1984 | Scheurenbrand | B60K 15/04 141/285 |
| 4,630,749 A | | 12/1986 | Armstrong et al. | |
| 4,917,157 A | | 4/1990 | Gifford et al. | |
| 4,946,060 A | * | 8/1990 | Sherwood | B60K 15/04 141/286 |
| 4,966,299 A | | 10/1990 | Teets et al. | |
| 6,691,750 B1 | | 2/2004 | Foltz | |
| 7,549,443 B2 | | 6/2009 | Levey et al. | |

(Continued)

FOREIGN PATENT DOCUMENTS

FR    2753138 A1    3/1998
WO    2005077698 A1    8/2005
(Continued)

OTHER PUBLICATIONS

ISR and WO for PCT/US2014/064300 dated Feb. 25, 2015.

*Primary Examiner* — Robert J Hicks
(74) *Attorney, Agent, or Firm* — Joseph M. Butscher; The Small Patent Law Group, LLC (57) ABSTRACT

A fuel nozzle receiving assembly may include a base having a nozzle channel formed therethrough, an outer wall connected to the base, wherein an internal chamber is defined between the base and the outer wall, and a seal member secured to the base and extending around at least a portion of the nozzle channel. The seal member is configured to sealingly engage a fuel nozzle that passes into and through the nozzle channel.

18 Claims, 5 Drawing Sheets

(56) References Cited

U.S. PATENT DOCUMENTS

| | | |
|---|---|---|
| 7,950,425 B2 | 5/2011 | Och |
| 2007/0000574 A1 | 1/2007 | DeCapua et al. |
| 2010/0295332 A1 | 11/2010 | Benjey |
| 2011/0132906 A1 | 6/2011 | Miller et al. |
| 2012/0217240 A1 | 8/2012 | Dutzi et al. |
| 2013/0228576 A1 | 9/2013 | Gerdes |
| 2016/0009173 A1 | 1/2016 | Sperando et al. |

FOREIGN PATENT DOCUMENTS

| | | |
|---|---|---|
| WO | 2010021829 A1 | 2/2010 |
| WO | 2010133960 A1 | 11/2010 |
| WO | 2011053563 A1 | 5/2011 |
| WO | 2014133813 A1 | 9/2014 |

\* cited by examiner

FUEL NOZZLE RECEIVING ASSEMBLY

RELATED APPLICATIONS

This application is a National Phase of International Application No. PCT/US2014/064300, filed Nov.6, 2014, and relates to and claims priority benefits from U.S. Provisional Patent Application No. 61/918,295, filed Dec. 19, 2013, which is hereby incorporated by reference in its entirety.

FIELD OF EMBODIMENTS OF THE DISCLOSURE

Embodiments of the present disclosure generally relate to fuel nozzle receiving systems of vehicles, and more particularly, to fuel nozzle receiving systems that may be configured to inhibit improper or incompatible fuel nozzles from dispensing fuel into a fuel tank.

BACKGROUND

Various vehicles, such as automobiles, are powered by gasoline, diesel fuel, or the like. As such, the vehicles typically include fuel systems having a tank configured to retain fuel, such as gasoline or diesel fuel, and a fuel fill pipe that serves as an inlet for supplying fuel to the tank from a fuel nozzle of a refueling station. In general, a fuel fill pipe includes an opening that may be exposed during refueling to receive the nozzle. An exposed end portion of the fuel pipe is of sufficient size to receive a discharge tube of a refueling nozzle. The nozzle typically fits relatively loosely in the fuel fill pipe so that the nozzle may be quickly and easily inserted and removed from the fuel fill pipe.

Many passenger and commercial vehicles are powered through diesel fuel. The automotive industry continues to produce diesel powered vehicles at an increasing rate. Refueling stations provide diesel fuel for customers. Indeed, in Europe, nearly 50% of all passenger vehicles are powered by diesel fuel.

However, many diesel powered vehicles are susceptible to being mis-fueled (for example, mistakenly fueled) with gasoline. Gasoline nozzles typically are smaller than diesel nozzles and may be inserted into a refueling orifice of a diesel powered vehicle. Conversely, the larger size of a diesel nozzle typically prevents it from being inserted into the smaller refueling orifice of a gasoline powered vehicle.

Accordingly, various fuel systems include a mis-fuel inhibitor (MFI). An MFI is a device configured to prevent a gasoline nozzle from being inserted into a diesel fuel tank, or vice versa. For example, one type of MFI includes an inlet having an opening that prevents mis-fueling by nozzles having a diameter that exceeds that of the opening. As an example, the MFI may include top and bottom doors. While an improper nozzle may be inserted past the top door, the nozzle generally is unable to engage the bottom door as the diameter of the nozzle is too large to pass through a passage proximate to the bottom door. Another type of MFI includes a locking bottom door that only allows a complimentary nozzle to fit therethrough. Additional MFI systems are disclosed in WO 2005/077698, WO 2010/021829, WO 2011/053563, U.S. Pat. Nos. 7,950,425, 7,549,443, and FR 2 753 138, for example.

As fuel efficiency standards are promulgated, many manufacturers seek to minimize sizes and weights of certain components of vehicles, in order to reduce the overall weight of the vehicle. Also, additional components may be secured within spaces of vehicles, such as vehicle frames. MFIs mounted within a nozzle-receiving assembly are also becoming smaller. Smaller MFIs are needed that will accommodate larger nozzles in reduced volumes and spaces within the vehicles.

A known MFI assembly includes a main body in which a lower door includes a separate and distinct component that prevents a nozzle from hooking onto the door as the nozzle is attempted to be removed from the MFI assembly. The feature provides another component to be formed, which adds time and cost to the manufacturing process.

SUMMARY OF EMBODIMENTS OF THE DISCLOSURE

Certain embodiments of the present disclosure provide a fuel nozzle receiving assembly (such as a MFI assembly) that may include a base having a nozzle channel formed therethrough, an outer wall connected to the base, wherein an internal chamber is defined between the base and the outer wall, and a seal member secured to the base and extending around at least a portion of the nozzle channel. The seal member is configured to sealingly engage a fuel nozzle that passes into and through the nozzle channel. The seal member may extend around an entire circumference of the nozzle channel.

In at least one embodiment, the outer wall may include a protective rim that surrounds an outer surface of the base. The protective rim is configured to protect the seal member from damage during handling and storage, for example.

The fuel nozzle receiving assembly may also include an additional seal member secured to a portion of the outer wall. For example, the outer wall may include a radially-extending flange. The additional seal member may be secured over and around the radially-extending flange.

The fuel nozzle receiving assembly may include a protective support positioned proximate to the nozzle channel. The protective support is configured to support the fuel nozzle within the nozzle channel, and is configured to protect the seal member from damage. In at least one embodiment, the protective support may include an upstanding wall that extends from an internal surface of the outer wall. In at least one embodiment, the protective support includes a protuberance extending from an internal surface of the base.

The fuel nozzle receiving assembly may also include a nozzle barrier door pivotally secured to the base. The nozzle barrier door closes the nozzle channel in a closed position. In at least one embodiment, the nozzle barrier door is devoid of a nozzle hooking prevention feature.

Certain embodiments of the present disclosure provide an improper fuel nozzle insertion-inhibiting assembly configured to prevent an improper fuel-dispensing device from dispensing fuel into a fuel fill line of a vehicle fuel nozzle receiving assembly. The improper fuel nozzle insertion-inhibiting assembly may include a cover having a nozzle inlet barrier door, and a main body secured to the cover. The main body may include a base having a nozzle channel formed therethrough, an outer wall connected to the base, wherein an internal chamber is defined between the base and the outer wall, and a seal member secured to and extending around at least a portion of the nozzle channel. The seal member is configured to sealingly engage a fuel nozzle that passes into and through the nozzle channel.

Before the embodiments of the disclosure are explained in detail, it is to be understood that the disclosure is not limited in its application to the details of construction and the arrangement of the components set forth in the following description or illustrated in the drawings. The disclosure is capable of other embodiments and of being practiced or being carried out in various ways. Also, it is to be understood that the phraseology and terminology used herein are for the purpose of description and should not be regarded as limiting. The use of "including" and "comprising" and variations thereof is meant to encompass the items listed thereafter and equivalents thereof as well as additional items and equivalents thereof.

DETAILED DESCRIPTION OF EMBODIMENTS OF THE DISCLOSURE

Embodiments of the present disclosure provide a fuel nozzle receiving assembly, such as an improper fuel nozzle insertion-inhibiting assembly, or MFI assembly, that may include a cover connected to a main body. The cover may include a nozzle inlet barrier door, while the main body may include a nozzle outlet barrier door. The main body may include a circumferential seal member secured over a flange extending from a wall, such as a cylindrical wall. The seal member may be molded directly onto the flange. The seal member is configured to provide a sealing engagement between the main body and one or both of an inlet pipe and/or the cover.

The main body may also include a base having a nozzle channel formed therethrough. The nozzle outlet barrier door is configured to close the nozzle channel while in the closed position. An upstanding wall may surround the base on a rear side. A seal member may be secured to internal edge portions of the base that surround the nozzle channel. In at least one embodiment, the seal member may be molded directly onto the base surrounding the nozzle channel. The upstanding wall protects the seal member during handling and storage. Additionally, the main body may include a support wall proximate to the nozzle channel. In at least one embodiment, the support wall may define a portion of the nozzle channel and includes structure that abuts against the seal member. The support wall protects the seal member during fuel nozzle insertion, so that the insertion and removal of the fuel nozzle does not damage the seal member.

Embodiments of the present disclosure provide a fuel nozzle receiving assembly, such as an MFI assembly, having at least one seal member. Embodiments of the present disclosure eliminate the need for a two-part lower door that would otherwise require a component that prevents a nozzle hooking thereon.

An improper fuel nozzle insertion-inhibiting assembly, or MFI assembly, is described in PCT application WO 2014/133813, entitled "Improper Fuel Nozzle Insertion-Inhibiting Assembly," which was filed Feb. 17, 2014, and which claims priority to U.S. Provisional Application No. 61/770,112, which was filed Feb. 27, 2013. PCT application WO 2014/133813 is hereby incorporated by reference in its entirety.

Figure 1:
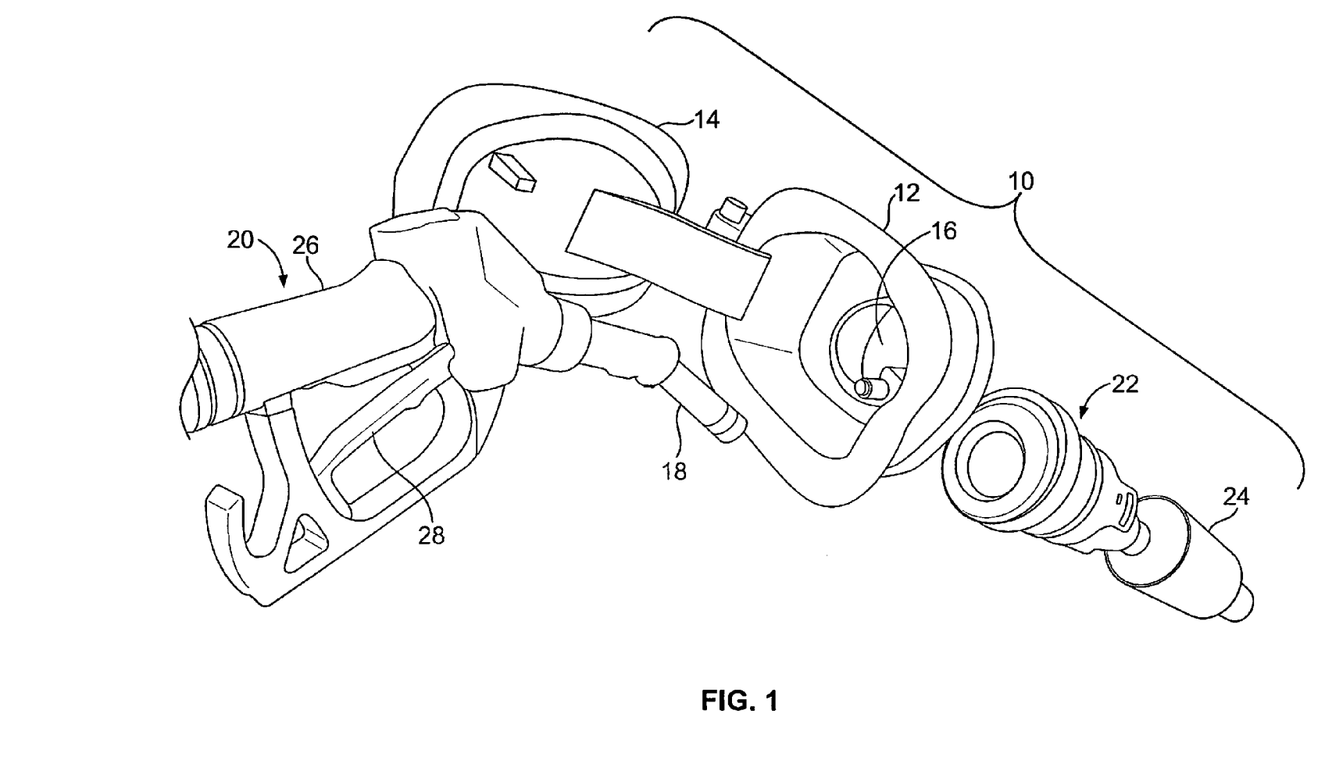
FIG. 1 illustrates a perspective view of a fuel intake system, according to an embodiment of the present disclosure.

FIG. 1 illustrates a perspective view of a fuel intake system 10, according to an embodiment of the present disclosure. The fuel intake system 10 may include a nozzle-receiving housing 12, which may be secured to a frame of a vehicle, for example. The nozzle-receiving housing 12 may include a door 14 that pivotally connects to the housing 12. The door 14 is configured to be pivoted between open and closed positions. The housing 12 defines an opening 16 into which a nozzle 18 of a fuel-dispensing device 20 may be inserted.

The housing 12 may directly or indirectly connect to an improper fuel nozzle insertion-inhibiting assembly, such as a mis-fuel inhibitor (MFI) assembly 22. The MFI assembly 22 is configured to prevent improper fuel-dispensing devices (for example, fuel-dispensing devices that are incompatible with the fuel intake system 10) from dispensing fuel into a fuel fill pipe 24 connected to the MFI assembly 22. For example, the MFI assembly 22 prevents a diesel fuel-dispensing device from being inserted into a gasoline fuel intake system, or vice versa. That is, a diesel fuel-dispensing device is an improper or incompatible fuel-dispensing device in relation to a gasoline fuel intake system, while a gasoline fuel-dispensing device is an improper or incompatible fuel-dispensing device in relation to a diesel fuel intake system.

The fuel-dispensing device 20 includes a handle 26 operatively connected to a trigger 28. The handle 26 is configured to be grasped by an operator and connects to the nozzle 18.

Figure 2:
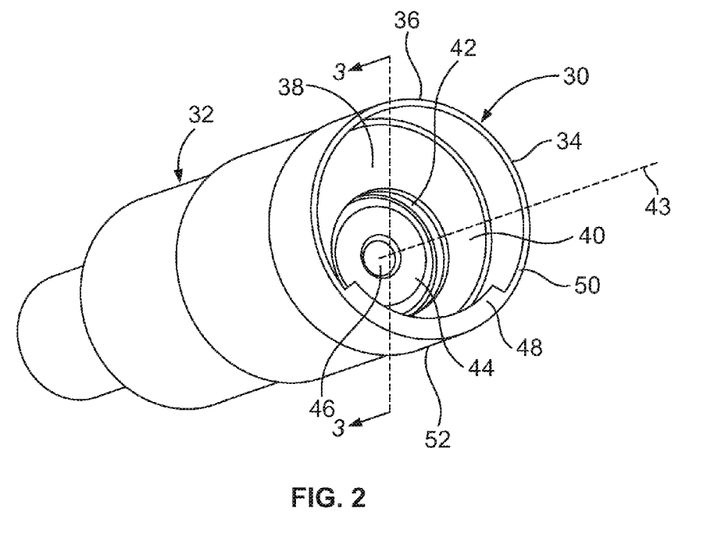
FIG. 2 illustrates a perspective front view of a mis-fuel inhibitor (MFI) assembly secured to a fuel fill pipe, according to an embodiment of the present disclosure.

FIG. 2 illustrates a perspective front view of a mis-fuel inhibitor (MFI) assembly 30 secured to a fuel fill pipe 32, according to an embodiment of the present disclosure. The MFI assembly 30 includes a cover 34 having a circumferential wall 36. The circumferential wall 36 may be circular in cross-section and connects to a front face wall 38 that may be generally perpendicular to the circumferential wall 36. For example, the front face wall 38 may form a base from which the circumferential wall 36 outwardly extends. An open nozzle-receiving cavity 40 is defined between the circumferential wall 36 and the front face wall 38. A channel 42 is formed through the front face wall 38. The channel 42 provides an inlet for a nozzle-receiving passage that extends through an internal chamber of the MFI assembly 30. A nozzle inlet barrier door 44 is pivotally secured within the channel 42. A pressure-relief valve 46 may be secured within the nozzle inlet barrier wall 44. Alternatively, the pressure-relief valve 46 may not be secured to the nozzle inlet barrier door 44. Instead, the nozzle inlet barrier door 44 may simply include a contiguous covering panel.

An arcuate nozzle-latching member 48, such as a ridge, rim, lip, or the like, may inwardly and radially extend from the circumferential wall 36 toward a central longitudinal axis 43 of the MFI assembly 30. The nozzle-latching member 48 may inwardly extend from a front edge 50 of the circumferential wall 36 and may generally conform to the curvature of the circumferential wall 36. The nozzle-latching member 48 may extend inwardly from a bottom 52 of the circumferential wall 36 over a radial angle of approximately 45°. Alternatively, the nozzle-latching member 48 may extend over distances that are greater or less than a radial angle of 45°. For example, the nozzle-latching member 48 may extend around an entire internal diameter of the circumferential wall 36. Additionally, the nozzle-latching member 48 may optionally be positioned further toward the front face wall 38, instead of the front edge 50. As shown in FIG. 2, however, the nozzle-latching member 48 is within the cavity 40 outside of the nozzle inlet barrier door 44.

Figure 3:
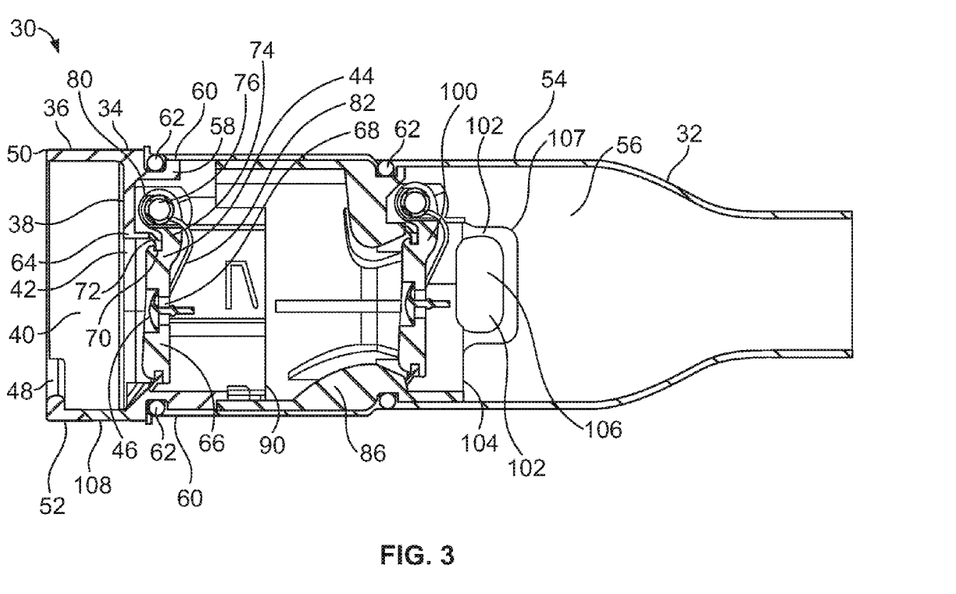
FIG. 3 illustrates an internal cross-sectional view of an MFI assembly secured to a fuel fill pipe through line 3-3 of FIG. 2, according to an embodiment of the present disclosure.

FIG. 3 illustrates an internal cross-sectional view of the MFI assembly 30 secured to the fuel fill pipe 32 through line 3-3 of FIG. 2, according to an embodiment of the present disclosure. The fuel fill pipe 32 may include an inlet pipe 54 defining an internal channel 56 that connects to a fuel tank (not shown).

The circumferential wall 36 of the MFI assembly 30 connects to a main body 58 or nozzle guide that is secured to the internal channel 56 of the inlet pipe 54. For example, the main body 58 may have an outer diameter that is less than that of the internal channel 56 of the inlet pipe 54, while the diameter of the circumferential wall 36 is greater than the diameter of the internal channel 56. As such, the main body 58 may be slid into the internal channel 56 until the circumferential wall 36 abuts against the inlet pipe 54. The main body 58 may securely connect to the inlet pipe 54 through an interference fit, for example.

The main body 58 may include a ledge 60 connected to the circumferential wall 36. The ledge 60 may retain a sealing member 62, such as an elastomeric gasket, O-ring, or the like, that provides a seal between the main body 58 and the inlet pipe 54. Optionally, as described below with respect to FIGS. 6-8, the main body 58 may include a radially-extending flange over which a seal member is secured. For example, a circumferential seal member may be overmolded directly onto and around the flange.

As noted above, the nozzle inlet barrier door 44 is pivotally secured within the channel 42. The channel 42 is defined by an inwardly-directed tubular wall 64 that is generally perpendicular to the front face wall 38 and parallel with the circumferential wall 36.

The nozzle inlet barrier door 44 may include a covering panel 66 having a valve-retaining opening 68 formed therein. The valve-retaining opening 68 retains the pressure relief valve 46. When internal pressure exceeds a particular pre-defined threshold, the pressure-relief valve 46 may be forced open in relation to the valve-retaining opening 68, to allow fluid pressure to be released through the valve-retaining opening 68. When the pressure drops below the pre-defined threshold, the pressure relief valve 46 re-seats on the covering panel 66, thereby closing the valve-retaining opening 68.

The covering panel 66 may include a circumferential slot 70 that retains a radial seal 72 that outwardly and radially extends from the covering panel 66. In the closed position, the radial seal 72 sealingly engages the wall 64, thereby preventing fluid and debris, such as dust, from passing into an internal chamber 90 of the MFI assembly 30. Alternatively, instead of, or in addition to, the radial seal extending from the covering panel 66, a seal may radially extend inwardly from the wall 64 of the main body 58.

The nozzle inlet barrier door 44 also includes a hinge 74 that extends rearwardly from the covering panel 66. The hinge 74 includes integrally formed posts 76 that extend outwardly from an upper portion of the hinge 74. The posts 76 may define a pivot axle. For example, two opposed posts 76 may extend from an upper portion of the hinge 74. The posts 76 are pivotally secured within reciprocal post-receiving channels 80 of an axle bearing formed in the main body 58 behind the front face wall 38. As such, the nozzle inlet barrier door 44 pivotally connects to the main body 58 of the cover 34 without the use of separate and distinct pins, for example. In systems with pins, the additional component of the pin adds size. As such systems with pins are typically larger and bulkier than embodiments of the present disclosure. Further, the process of forming through-holes to accommodate and retain the pins, as well as ultrasonic welding of the holes, is labor and time-intensive, and therefore costly. Certain embodiments of the present disclosure provide assemblies that eliminate or otherwise reduce such costs.

One or more torsion springs 82 may be operatively connected to the hinge 74 and a rear surface of the covering panel 66. The torsion spring(s) 82 ensure that the nozzle inlet barrier door 44 remains in a closed position. The torsion spring(s) 82 resist force that tends to pivot the nozzle inlet barrier door 44 into an open position, such as a vacuum force produced within a fuel tank. Alternatively, the MFI assembly 30 may not include the torsion spring(s) 82. Instead, the nozzle inlet barrier door 44 may exert sufficient resistive force to ensure that the nozzle inlet barrier 44 remains closed.

The main body 58 may also include internal restricting members 86 downstream (in relation to a location where a fuel nozzle is inserted and urged into the MFI assembly 30) from the nozzle inlet barrier door 44. The restricting members 86 may be inwardly directed ribs, fins, panels, or the like that effectively reduce the internal diameter of the internal chamber 90 of the MFI assembly 30. For example, a diameter of a nozzle passage area within the internal chamber 90 proximate to the nozzle inlet barrier door 44 is greater than a diameter of a nozzle passage area within the internal chamber 90 proximate to a nozzle outlet barrier door 100 that covers a nozzle channel. Thus, while a nozzle having a particular diameter may be able to pass into the internal chamber 90 through the nozzle inlet barrier door 44, the nozzle may have a diameter that is too large to pass between the restricting members 86. As such, the nozzle may be unable to abut against a front surface of the nozzle outlet barrier door 100.

The nozzle outlet barrier door 100 may be configured similar to the nozzle inlet barrier door 44. The nozzle outlet barrier door 100 may be pivotally secured to the main body 58 downstream from the restricting member 86.

As described below with respect to FIGS. 6-8, the nozzle channel that is covered by the nozzle outlet barrier door 100 may be defined by an internal edge of a base over which a seal member is secured. For example, a seal member may be overmolded directly onto and around the edge that defines the nozzle channel.

The main body 58 may also include one or more snap rims 102 that extend longitudinally outward from a trailing edge 104 of the main body 58. Each snap rim 102 may be configured to snapably engage a reciprocal latch 106 (such as a protuberance that conforms to a shape of an internal opening 107 formed within the snap rim 102) of the fuel fill pipe 32 that inwardly protrudes into the internal channel 56. In this manner, the snap rim(s) 102 securely connect the MFI assembly 30 to the fuel fill pipe 32.

As shown, an additional sealing member 62 may sealingly connect the main body 58 to the inlet pipe 54 proximate to the nozzle outlet barrier door 100. Alternatively, the MFI assembly 30 may include more or less sealing members 62 than shown.

The MFI assembly 30 may also include a drain 108 formed through the bottom 52 of the circumferential wall 36. The drain 108 may be an open-ended passage that allows fluid that collects within the open cavity 40 to drain out of the MFI assembly 30.

Figure 4:
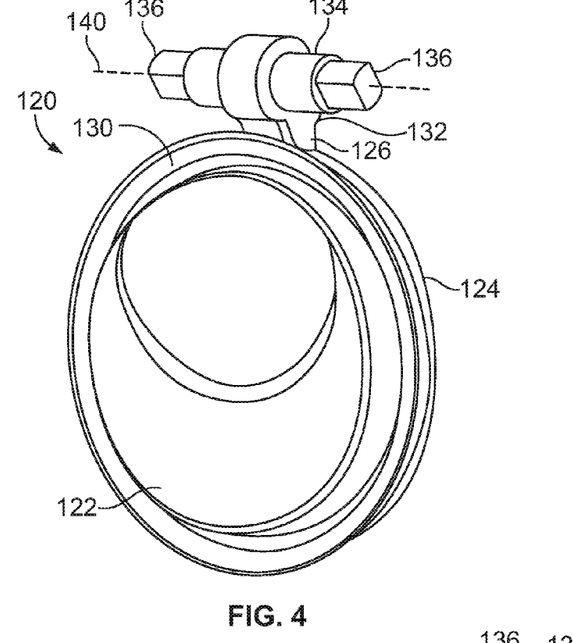
FIG. 4 illustrates a perspective front view of a nozzle barrier door, according to an embodiment of the present disclosure.

FIG. 4 illustrates a perspective front view of a nozzle barrier door 120, according to an embodiment of the present disclosure. The nozzle barrier door 120 may be used as a nozzle inlet barrier door, such as the nozzle inlet barrier door 44, or a nozzle outlet barrier door, such as the nozzle outlet barrier door 100, within an MFI assembly, such as the MFI assembly 30 shown and described with respect to FIGS. 2 and 3. Optionally, various other nozzle barrier doors may be used with respect to embodiments of the present disclosure.

The nozzle barrier door 120 may include a covering panel 122. While not shown, the covering panel 122 may include a valve-retaining opening that retains a pressure relief valve, as described above. Optionally, the covering panel 122 may not include a valve-retaining opening that retains a pressure relief valve.

A seal member 124 may radially extend around a circumferential edge of the covering panel 122. In the closed position, the seal member 122 sealingly engages a wall of the MFI assembly, thereby preventing fluid and debris, such as dust, from passing into an internal chamber of the MFI assembly. The seal member 124 may be a separate and distinct seal member that is secured to the covering panel 122. Optionally, the seal member 124 may be overmolded onto the covering panel 122.

The nozzle barrier door 122 also includes a hinge 126 that extends upwardly from a rear surface 128 of the covering panel 122. As shown, the seal member 124 may be disposed in front of the hinge 126. As such, the hinge 126 may be set back from a front surface 130 of the covering panel 122.

The hinge 126 may include a stud 132 that upwardly extends from the covering panel 122. The stud 132 connects to a crossbeam 134 that may generally be perpendicular to a longitudinal axis of the stud 132. Opposed posts 136 extend outwardly from opposite sends of the crossbeam 134. The posts 136 may define a pivot axle 140. The posts 136 are configured to be pivotally secured within reciprocal post-receiving channels of an axle bearing formed in a main body of an MFI assembly, as described above. Accordingly, the nozzle barrier door 120 pivotally connects to the main body of the MFI assembly without the use of separate and distinct pins, for example.

The nozzle barrier door 120, whether an inlet barrier door or an outlet barrier door, secures to an MFI assembly, such as a cover of the MFI assembly, without the use of separate and distinct pins. As such, through-holes are not formed through the MFI assembly. Because through-holes are not required to be formed through the MFI assembly, there is no need for ultrasonic welding, for example, or a separate flap bracket component to secure the nozzle barrier door 120 to the MFI assembly.

Figure 5:
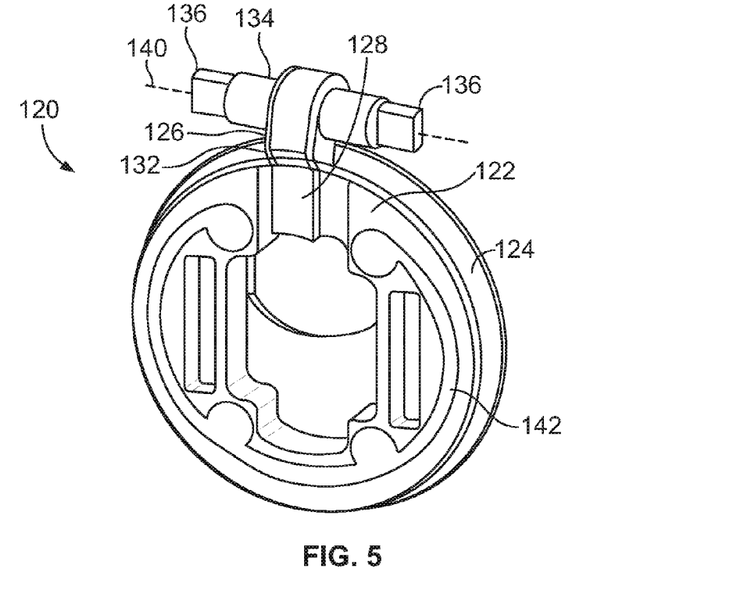
FIG. 5 illustrates a perspective rear view of a nozzle barrier door, according to an embodiment of the present disclosure.

FIG. 5 illustrates a perspective rear view of the nozzle barrier door 120. As shown in FIG. 5, the seal member 124 may be formed through the covering panel 122. For example, the seal member 124 may include an interior body 142 that is secured within an internal chamber of the covering panel 122. Outer edges of the seal member 124 may extend past the outer edges of the covering panel 122, thereby providing a seal member that radially extends past outer edges of the covering panel 122.

Figure 6:
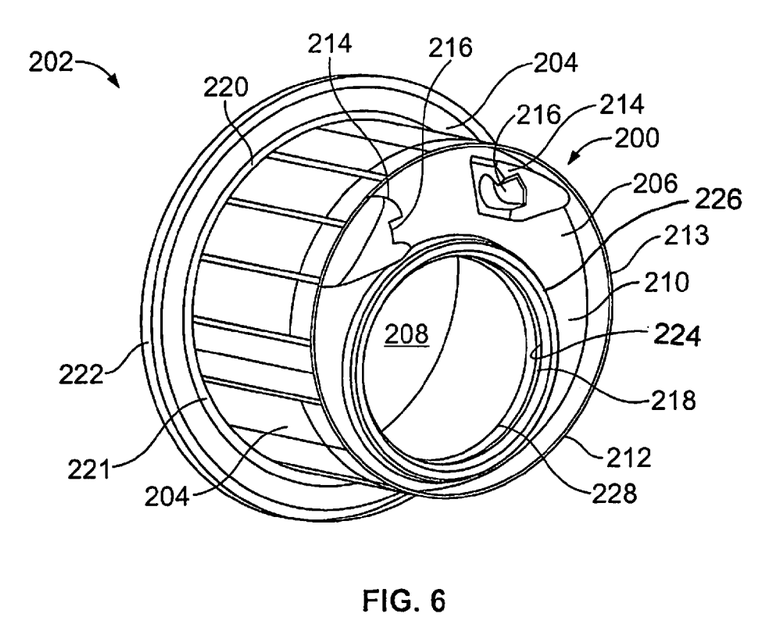
FIG. 6 illustrates a perspective rear view of a main body of an MFI assembly, according to an embodiment of the present disclosure.

FIG. 6 illustrates a perspective rear view of a main body 200 of a fuel nozzle receiving assembly, such as an MFI assembly 202, according to an embodiment of the present disclosure. The main body 200 may be used in place of the main body 58, shown in FIGS. 2 and 3, for example. In at least one embodiment, the main body 200 may form the entire MFI assembly 202. For example, the main body 200 may provide a cover for the MFI assembly 202. In general, the main body 200 may provide a cover in that it covers portions of an internal chamber, for example.

The main body 200 may be formed of a plastic, metal, or the like. For example, the main body 200 may be formed of an integrally molded and formed piece of injection-molded plastic. Seal members may be overmolded directly onto portions of the main body 200.

The main body 200 includes an outer wall 204, such as a circumferential, cylindrical, or perimeter wall, connected to a base 206 that resides in one or more planes that may generally be perpendicular to the outer wall. An internal chamber 208 is defined between internal surfaces of the outer wall 204 and a front or internal surface of the base 206. As shown, a rear or outer surface 210 of the base 206 is recessed, such that the outer wall 204 provides a protective rim 212 around the rear surface 210. Thus, the outer wall 204 provides the protective rim 212 at a rear or distal end 213.

Opposed axle bearings 214 having reciprocal post-receiving channels 216 extend rearwardly from the rear surface 210 above a nozzle channel 218 formed through the base 206. The opposed axle bearings 214 are configured to receive posts of a nozzle barrier door, as described above.

A flange 220 radially extends from the outer wall 204 at a front or proximal end 221. The flange 220 may be a flat rim, for example, that may reside in a plane that is generally parallel with the base 206.

A first or outer seal member 222 is secured over and around the flange 220. The seal member 222 may be formed of rubber, an elastomeric material, a gasket, or other such sealing materials, and is configured to provide a sealing interface between the main body 200 and one or both of a separate and distinct cover, such as the cover 34 (shown in FIGS. 2 and 3) and/or a fuel fill pipe, such as the fuel fill pipe 32 (shown in FIGS. 2 and 3). The seal member 222 may wrap around front and rear surfaces of the flange 220, and may extend over at least a portion of a front wall, if any, of the main body 200.

A second or inner seal member 224 is secured over and around an internal edge portion 226 of the base 206 that defines at least a portion of the nozzle channel 218. As shown, the seal member 224 may extend around or otherwise over an entire internal circumference of the nozzle channel 218. That is, the seal member 224 may contiguously extend around or otherwise over the entire internal circumference of the nozzle channel 218. The seal member is configured to provide a sealing interface between the main body 200 and a nozzle that is inserted into and through the nozzle channel 218. It is to be understood that the "first" and "second" seal members merely refer to the number of seals that may be present. The first seal member may alternatively be the second seal member, and vice versa.

A protective support 228, such as a rim, wall, ring, tube, or the like, that may define at least a portion of the nozzle channel 218 is axially aligned with and may abut into the seal member 224. The protective support 228 may be an upstanding wall that extends below the nozzle channel 218 from an internal surface of the outer wall 204. In another embodiment, the protective support 228 may be a protuberance, such as a block, stud, or the like, that outwardly extends from a front surface of the base 206 underneath the nozzle channel 218. In at least one embodiment, the protective support 228 may be defined by a first edge portion of the base 206 that defines the nozzle channel 218, while the seal member 224 surrounds the remaining second edge portion of the base 216 that defines the nozzle channel 218. The seal member 224 may be disposed towards and/or on the rear surface 210 of the base 206, while the protective support 228 is disposed towards and/or on an opposite internal surface of the base 206. Alternatively, the seal member 224 may be disposed towards and/or on the internal surface of the base 206, while the protective support 228 is disposed towards and/or on the rear surface 210 of the base 206. As another alternative, the seal member 224 may be secured to the base 206 such that it surrounds an entirety of the edge that defines the nozzle channel 218.

During fuel nozzle insertion and removal, the seal member 224 sealingly engages the fuel nozzle as it passes into and through the nozzle channel 218. The protective support 228 supports the fuel nozzle as it passes into and through the nozzle channel 218. As such, at least a portion of the force exerted by the fuel nozzle into the nozzle channel 218 is borne by the protective support 228, and not the seal member 224. Accordingly, the seal member 224 is protected from damage by the fuel nozzle, as at least a majority of the weight and exerted force of the fuel nozzle may be directed into the protective support 228, and not seal member 224. In this manner, the protective support 228 protects the seal member 224 from damage, such as tearing, and dislodging from the base 206.

Figure 7:
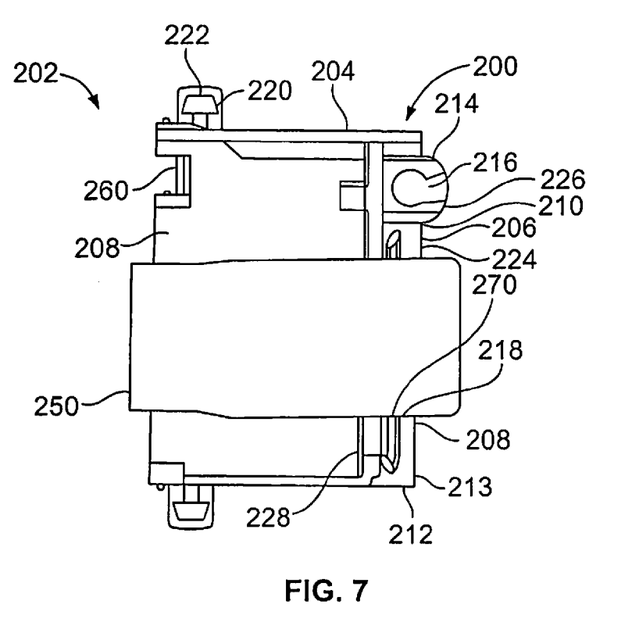
FIG. 7 illustrates a transverse cross-sectional view of a main body of an MFI assembly with a fuel nozzle positioned within an internal chamber, according to an embodiment of the present disclosure.

FIG. 7 illustrates a transverse cross-sectional view of the main body 200 of the MFI assembly 202 with a fuel nozzle 250 positioned within the internal chamber 208, according to an embodiment of the present disclosure. As shown in FIG. 7, the seal member 222 may wrap around the flange 220, and may cover at least a portion of a front face 260 of the main body 200 that surrounds a nozzle inlet channel that passes through the internal chamber 208.

The protective rim 212 extends from the rear surface 210 of the base 206 below the seal member 224. In this manner, the protective rim 212 provides a barrier that protects the seal member 224 from being contacted by structures outside of the main body 200 during shipping and storage. For example, the protective rim 212 may support the main body 200 on a surface such that the seal member 224 does not contact the surface.

When the fuel nozzle 250 is inserted into and through the nozzle channel 218, the seal member 224 sealingly engages around outer surfaces 270 of the fuel nozzle 250. Accordingly, the seal member 224 provides a fluid-tight seal around the fuel nozzle 250 that prevents fluids, such as liquids or gases, from passing therethrough.

The protective support 228 supports the fuel nozzle 250 within the nozzle channel 218. As such, the weight of, and force exerted by, the fuel nozzle 250 is directed, at least partially, into the protective support 228, instead of entirely into the seal member 224. In this manner, the protective support 228 protects the seal member 224 from being damaged by the fuel nozzle 250.

Figure 8:
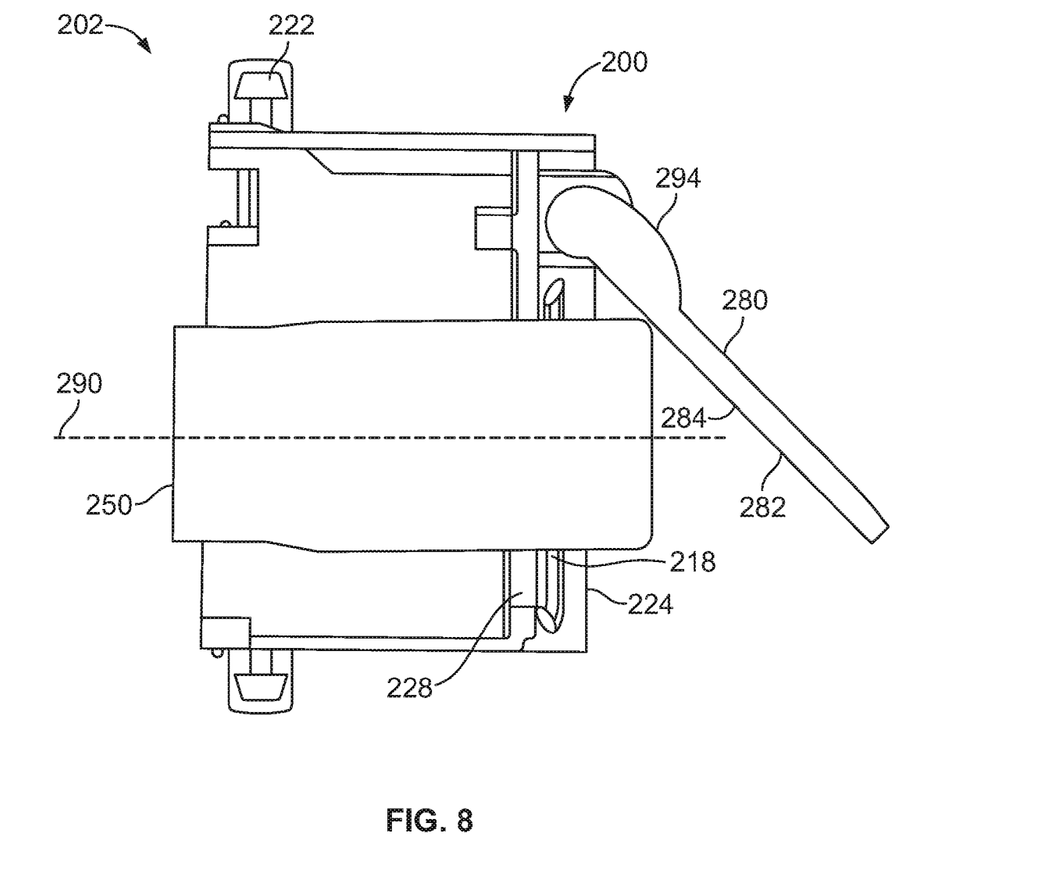
FIG. 8 illustrates a transverse cross-sectional view of a main body of an MFI assembly with a fuel nozzle pivoting a nozzle outlet barrier door open, according to an embodiment of the present disclosure.

FIG. 8 illustrates a transverse cross-sectional view of the main body 200 of the MFI assembly 202 with the fuel nozzle 250 pivoting a nozzle outlet barrier door 280 open, according to an embodiment of the present disclosure. As shown, the nozzle outlet barrier door 280 may include a simple, flat covering panel 282 having a relatively flat front face 284. There is no need for a hook prevention feature to be positioned on the nozzle outlet barrier door 280, as the seal member 224 prevents the fuel nozzle 250 from hooking onto the nozzle outlet barrier door 280. That is, as the fuel nozzle 250 is inserted through or removed from the nozzle channel 218, the seal member 224 sealingly engages around the fuel nozzle 250. Further, the protective support 228 and the seal member 224 ensure that the fuel nozzle is axially aligned about a longitudinal axis 290 of the nozzle channel 218, thereby preventing the fuel nozzle 250 from tipping upward toward a hinge 294 of the nozzle outlet barrier door 280 (a location that was previously susceptible to be snagging and hooking). Accordingly, a simpler, less expensive nozzle barrier door may be used with respect to embodiments of the present disclosure.

The nozzle outlet barrier door 280 may or may not include a separate and distinct seal. For example, the nozzle outlet barrier door 280 may be similar to that shown and described in FIGS. 4 and 5. Optionally, the nozzle outlet barrier door 280 may be a simpler door without a seal, as the seal member 224 provides a sealing interface with the nozzle outlet barrier door 280 when in a closed position. Accordingly, a simpler, more cost effective nozzle outlet barrier door may be used with respect to embodiments of the present disclosure.

Referring to FIGS. 1-8, embodiments of the present disclosure provide a fuel nozzle receiving assembly, such as an improper fuel nozzle insertion-inhibiting assembly, or MFI assembly, that may include a cover connected to a main body. The main body may include an outer or first seal member that is configured to sealingly engage a cover and/or fuel fill pipe. The main body may also include an inner or second seal member positioned in relation to a nozzle channel. The second seal member is configured to sealingly engage a fuel nozzle as it passes into and through the nozzle channel. A protective support may bear at least a portion of the weight and exerted force of the fuel nozzle, thereby protecting the seal member from damage. Embodiments of the present disclosure eliminate the need for a two-part lower door that would otherwise require a component that prevents a nozzle hooking thereon.

Embodiments of the present disclosure provide an MFI assembly that eliminates the need for a seal on a nozzle barrier door. Embodiments may be used with various fuel nozzle receiving assemblies, such as MFIs, capless covers, and the like. As shown and described, a seal member may be overmolded directly onto a cover, main body, or housing of an MFI assembly, or other such fuel nozzle receiving assembly. Molding the seal on the cover allows for a protective support, such as a wall, protuberance, or the like, to protect the seal member during fuel nozzle insertion.

While various spatial and directional terms, such as top, bottom, lower, mid, lateral, horizontal, vertical, front and the like may be used to describe embodiments of the present disclosure, it is understood that such terms are merely used with respect to the orientations shown in the drawings. The orientations may be inverted, rotated, or otherwise changed, such that an upper portion is a lower portion, and vice versa, horizontal becomes vertical, and the like.

Variations and modifications of the foregoing are within the scope of the present disclosure. It is understood that the embodiments disclosed and defined herein extend to all alternative combinations of two or more of the individual features mentioned or evident from the text and/or drawings. All of these different combinations constitute various alternative aspects of the present disclosure. The embodiments described herein explain the best modes known for practicing the disclosure and will enable others skilled in the art to utilize the disclosure. The claims are to be construed to include alternative embodiments to the extent permitted by the prior art.

To the extent used in the appended claims, the terms "including" and "in which" are used as the plain-English equivalents of the respective terms "comprising" and "wherein." Moreover, to the extent used in the following claims, the terms "first," "second," and "third," etc. are used merely as labels, and are not intended to impose numerical requirements on their objects. Further, the limitations of the following claims are not written in means-plus-function format and are not intended to be interpreted based on 35 U.S.C. §112(f), unless and until such claim limitations expressly use the phrase "means for" followed by a statement of function void of further structure.

Various features of the disclosure are set forth in the following claims.

The invention claimed is:

1. A fuel nozzle receiving assembly comprising:
   a base having a nozzle channel formed therethrough;
   an outer wall connected to the base, wherein an internal chamber is defined between the base and the outer wall, wherein the nozzle channel extends through a rear surface of the base that is opposite from the internal chamber defined between the base and the outer wall;
   a seal member secured to the base and extending around at least a portion of the nozzle channel, wherein the seal member is configured to sealingly engage a fuel nozzle that passes into and through the nozzle channel, wherein the seal member is disposed on at least a portion of the rear surface of the base; and
   a protective support positioned proximate to the nozzle channel, wherein the protective support is configured to abut into and support the fuel nozzle within the nozzle channel, wherein the protective support is disposed on at least a portion of an internal surface of the base that is opposite from the rear surface, and wherein the protective support is configured to protect the seal member from damage.

2. The fuel nozzle receiving assembly of claim 1, wherein the seal member extends around an entire circumference of the nozzle channel.

3. The fuel nozzle receiving assembly of claim 1, wherein the outer wall comprises a protective rim that surrounds an outer surface of the base, wherein the protective rim is configured to protect the seal member from damage during handling and storage.

4. The fuel nozzle receiving assembly of claim 1, further comprising an additional seal member secured to a portion of the outer wall.

5. The fuel nozzle receiving assembly of claim 4, wherein the outer wall comprises a radially-extending flange, and wherein the additional seal member is secured over and around the radially-extending flange.

6. The fuel nozzle receiving assembly of claim 1, wherein the protective support comprises an upstanding wall that extends from an internal surface of the outer wall, wherein a first opening defined by the protective support has a diameter that is the same as a second opening defined by the seal member at least when the fuel nozzle passes into and through the nozzle channel, and wherein the first and second openings are coaxial.

7. The fuel nozzle receiving assembly of claim 1, wherein the protective support comprises a protuberance extending from an internal surface of the base.

8. The fuel nozzle receiving assembly of claim 1, further comprising a nozzle barrier door pivotally secured to the base, wherein the nozzle barrier door closes the nozzle channel in a closed position.

9. The fuel nozzle receiving assembly of claim 8, wherein the nozzle barrier door is devoid of a nozzle hooking prevention feature.

10. An improper fuel nozzle insertion-inhibiting assembly configured to prevent an improper fuel-dispensing device from dispensing fuel into a fuel fill line of a vehicle fuel nozzle receiving assembly, wherein the improper fuel nozzle insertion-inhibiting assembly comprises:
    a cover comprising a nozzle inlet barrier door; and
    a main body secured to the cover, wherein the main body comprises:
       a base having a nozzle channel formed therethrough;
       an outer wall connected to the base, wherein an internal chamber is defined between the base and the outer wall, wherein the nozzle channel extends through a rear surface of the base that is opposite from the internal chamber defined between the base and the outer wall;
       a seal member secured to and extending around at least a portion of the nozzle channel, wherein the seal member is configured to sealingly engage a fuel nozzle that passes into and through the nozzle channel, wherein the seal member is disposed on at least a portion of the rear surface of the base; and
       a protective support positioned proximate to the nozzle channel, wherein the protective support is configured to abut into and support the fuel nozzle within the nozzle channel, wherein the protective support is disposed on at least a portion of an internal surface of the base that is opposite from the rear surface, and wherein the protective support is configured to protect the seal member from damage.

11. The improper fuel nozzle insertion-inhibiting assembly of claim 10, wherein the seal member extends around an entire circumference of the nozzle channel.

12. The improper fuel nozzle insertion-inhibiting assembly of claim 10, wherein the outer wall comprises a protective rim that surrounds an outer surface of the base, wherein the protective rim is configured to protect the seal member from damage during handling and storage.

13. The improper fuel nozzle insertion-inhibiting assembly of claim 10, wherein the main body further comprises an additional seal member secured to a portion of the outer wall.

14. The improper fuel nozzle insertion-inhibiting assembly of claim 10, wherein the protective support comprises an upstanding wall that extends from an internal surface of the outer wall, wherein a first opening defined by the protective support has a diameter that is the same as a second opening defined by the seal member at least when the fuel nozzle that passes into and through the nozzle channel, and wherein the first and second openings are coaxial.

15. The improper fuel nozzle insertion-inhibiting assembly of claim 10, wherein the protective support comprises a protuberance extending from an internal surface of the base.

16. The improper fuel nozzle insertion-inhibiting assembly of claim 10, wherein the main body further comprises a nozzle barrier door pivotally secured to the base, wherein the nozzle barrier door closes the nozzle channel in a closed position.

17. The improper fuel nozzle insertion-inhibiting assembly of claim 16, wherein the nozzle barrier door is devoid of a nozzle hooking prevention feature.

18. An improper fuel nozzle insertion-inhibiting assembly configured to prevent an improper fuel-dispensing device from dispensing fuel into a fuel fill line of a vehicle fuel nozzle receiving assembly, wherein the improper fuel nozzle insertion-inhibiting assembly comprises:
 a base having a nozzle channel formed therethrough;
 a nozzle barrier door pivotally secured to the base, wherein the nozzle barrier door closes the nozzle channel in a closed position;
 an outer wall connected to the base, wherein an internal chamber is defined between the base and the outer wall, wherein the nozzle channel extends through a rear surface of the base that is opposite from the internal chamber defined between the base and the outer wall, wherein the outer wall comprises a protective rim that surrounds the rear surface of the base;
 a first seal member secured to a portion of the outer wall;
 a second seal member secured to and extending around an internal circumference of the nozzle channel, wherein the second seal member is disposed on at least a portion of the rear surface of the base, wherein the second seal member is configured to sealingly engage a fuel nozzle that passes into and through the nozzle channel, wherein the protective rim is configured to protect the second seal member from damage; and
 a protective support positioned proximate to the nozzle channel, wherein the protective support is disposed on at least a portion of an internal surface of the base that is opposite from the rear surface, wherein the protective support is configured to abut into and support the fuel nozzle within the nozzle channel, and wherein the protective support is configured to protect the second seal member from damage as the fuel nozzle is moved into and through the nozzle channel, wherein a first opening defined by the protective support has a diameter that is the same as a second opening defined by the seal member at least when the fuel nozzle passes into and through the nozzle channel, and wherein the first and second openings are coaxial.

* * * * *